Figure 4:
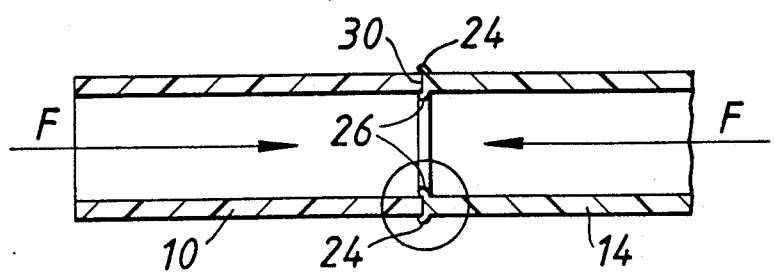
Figure 4A:
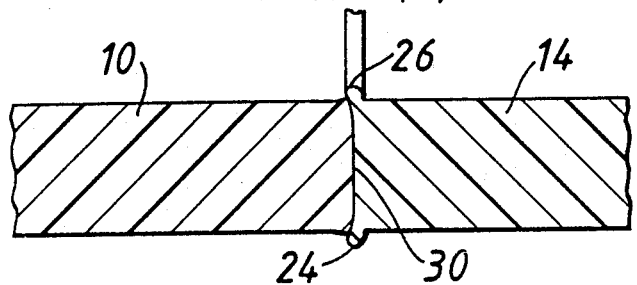

United States Patent [19]
Dickinson et al.

[11] Patent Number: 4,963,421
[45] Date of Patent: Oct. 16, 1990

[54] JOINING POLYOLEFINIC MEMBERS BY FUSION

[75] Inventors: Alan J. Dickinson, Cramlington; Trevor G. Stafford, Whiteley Bay, both of England

[73] Assignee: British Gas plc, London, England

[21] Appl. No.: 312,513

[22] Filed: Feb. 21, 1989

[30] Foreign Application Priority Data

Feb. 19, 1988 [GB] United Kingdom ............... 8803957

[51] Int. Cl.$^5$ .................... B29C 65/10; B29C 65/20
[52] U.S. Cl. .................................. 428/36.9; 156/158; 156/267; 156/304.2; 156/304.3; 156/304.6; 156/306.6; 156/309.6; 428/212; 138/155; 285/423
[58] Field of Search ............... 156/158, 304.1, 304.2, 156/304.3, 304.6, 499, 507, 306.6, 82, 157, 267, 309.6, 309.9, 497; 285/423; 138/155; 428/36.9, 36.92, 212, 515

[56] References Cited

U.S. PATENT DOCUMENTS

| | | | |
|---|---|---|---|
| 3,276,929 | 10/1966 | Ferch | 156/83 |
| 3,406,055 | 10/1968 | Rubel | 156/275.5 |
| 3,853,655 | 12/1974 | Pecha | 156/304.2 |
| 3,998,682 | 12/1976 | Harmsen | 156/309.6 |
| 4,076,282 | 2/1978 | Scott, Jr. et al. | 285/423 |

FOREIGN PATENT DOCUMENTS

| | | |
|---|---|---|
| 2026193 | 1/1971 | Fed. Rep. of Germany . |
| 2112807 | 6/1972 | France . |
| 58-029617 | 2/1983 | Japan ............... 156/304.2 |
| 1376430 | 12/1974 | United Kingdom . |

Primary Examiner—Michael Wityshyn
Attorney, Agent, or Firm—Larson and Taylor

[57] ABSTRACT

First and second members (e.g. pipes, fittings) of cross-linked polyolefinic material such as polyethylene having a melt flow index (MFI) of zero are joined using a third member of polyolefinic material such as polyethylene having a higher MFI e.g. 0.3. The first member 10 and the third member gripped by clamps 18, 20 of a butt fusion machine are pressed against opposite faces of a heater plate which is then withdrawn and the members are pressed together by the clamps. Only the third member is upset to form beads 24, 26. Part of the third member is removed leaving a stub part 16. The second member is joined to the stub's face 36 using the heater plate. The part 16 is upset leaving a thin wafer 48. The two interfaces 30, 50 limit the growth of cracks in the wafer to prevent their propagation through the pipe thickness under hoop stress. The beads are preferably removed at each stage.

17 Claims, 5 Drawing Sheets

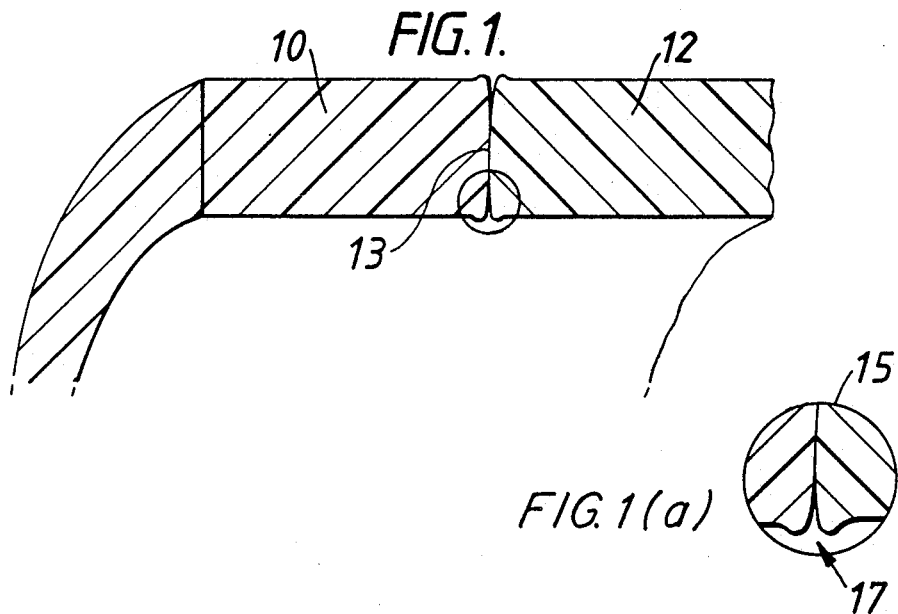
FIG. 1.
FIG. 1(a)
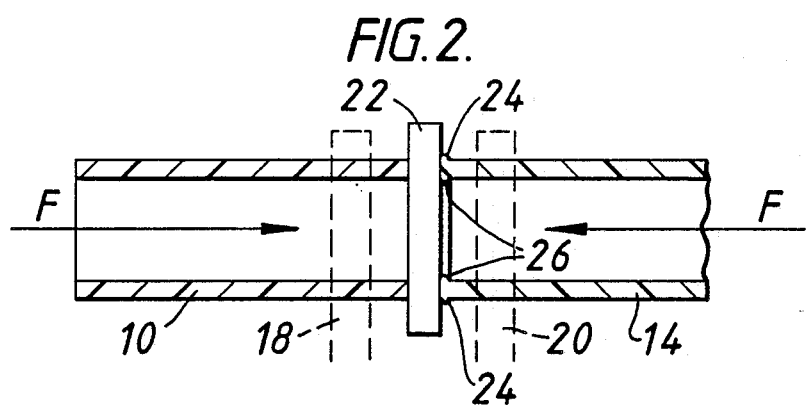
FIG. 2.
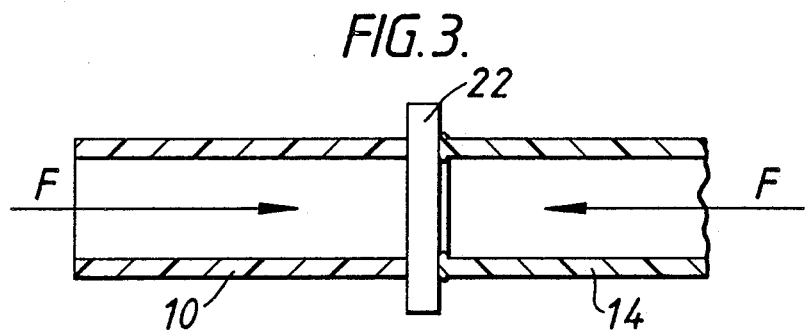
FIG. 3.

FIG. 9.
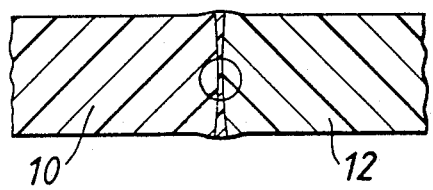
FIG. 9(a)
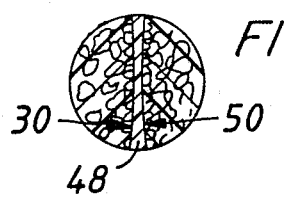
FIG. 10.
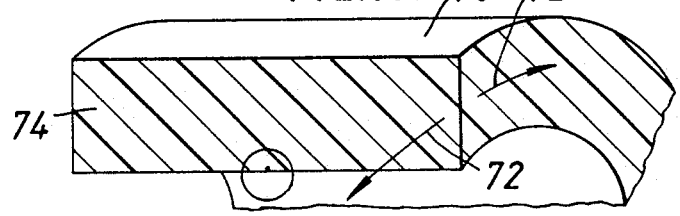
FIG. 10(a)
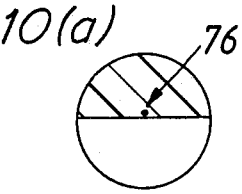
FIG. 11.
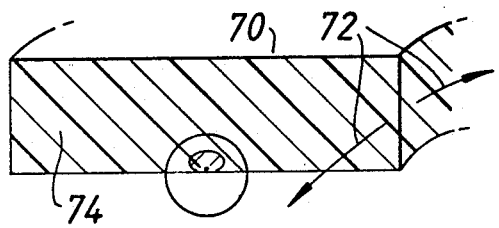
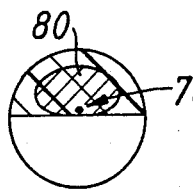
FIG. 11(a)

JOINING POLYOLEFINIC MEMBERS BY FUSION

The invention relates to joining members of polyolefinic material by fusion.

The joining of members of synthetic plastics materials by fusion is well known and is widely practised in the case of members composed of material having a Melt Flow Index of at least 0.2 such that during heating and joining the material of both members has flow capability to ensure full and perfect contact across their interface.

The term Melt Flow Index (MFI) as used herein has the meaning given by the tests defined in British Standard No. BS2782 method 720A 1979: Determination of melt flow rate for thermoplastics under the conditions of 190° Centigrade and a load of 21.1 Newtons the rate or index being expressed in grams per 10 minutes.

It is not known to join by fusion members made of polyolefinic material having an MFI of zero or of an extremely low value. Such an MFI is typical of crosslinked material or material which has been modified to increase the molecular weight to a relatively high value. Such material is regarded conventionally as having insufficient flow capability to permit it to be joined by fusion to any material.

FIG. 1 diagrammatically shows by way of illustration the result of an attempt to join by butt fusion two pipes 10, 12 of cross-linked polyethylene using a known procedure. The ends of the pipes were heated by pressing them against a heater plate in a butt fusion machine. The plate was removed and the ends were pressed together. The pressures and times used were in accordance with British Gas normal practice for polyethylene resins having an MFI of around 0.2. Some evidence of interface structure indicative of fusion was found at the zone indicated at 13 but such structure was entirely insufficient to constitute a joint between the two pipes 10, 12. At the inner and outer surfaces of the pipes 10, 12 (as indicated by the enlarged detail at 15) pronounced circumferential slit defects 17 were present. The sharpness and locations of these defects which extend into the interface structure in the zone }4 weaken such joint as is formed. The flaws are effectively infinitely sharp. The material to all intents was not upset during heating and the attempt to join the pipes. The lack of fusion generally is apparently due to the lack of melt movement to fill the voids in the slit zones. The interface pressure cannot apparently be maintained near to the inner and outer surfaces of the pipes, so no melt movement occurs.

According to the invention, a method of joining first and second members each composed of polyolefinic material having an MFI of zero or of an extremely low value comprises providing between said members a third member composed of polyolefinic material having a relatively higher MFI and by supplying energy to at least said third member and pressing together at least a surface of said third member and a surface of said first member in mutual alignment at an interface to join said first and third members by fusion at said interface.

Preferably, the method comprises
(a) pressing said respective surfaces of said first and third members against respective faces of heater means during a first period
(b) continuing to press said surfaces against said faces under reduced pressure during a second period
(c) separating said surfaces from said faces
(d) engaging said heated surfaces of said first and third members with each other in mutual alignment at an interface
(e) pressing said surfaces against each other during a third period
(f) cutting off an unwanted part of said third member to leave a stub part of said third member joined to said first member with each other at a second interface parallel to said first-mentioned interface.

As an alternative form of the method, energy can be supplied to the third member otherwise than by using such a heater means.

The third member may for example be composed of conductive material or contain conductive material such as metal particles, for example, or other additives; or the material may comprise a conductive compound to enhance conduction of energy into the third member: for example to enhance conduction. In other forms of the invention, energy may be supplied to the third member by radiation: for example by induction or by microwaves and the third member may comprise metallic or other conductive material e.g. metallic particles to facilitate or enhance heating of the third member by such supply of radiation energy. It will be understood that the surfaces of the members to be joined by fusion in such forms of the invention can be mutually engaged before, during, or after such supply of energy to the third member by radiation; or by conduction where the heating means engages the third member at a surface other than a surface at which fusion joining is to occur. The statement of the invention above is to be understood accordingly, the steps recited not necessarily all being performed sequentially or in the order in which they are given.

The invention includes members joined using the method.

Figure 5:
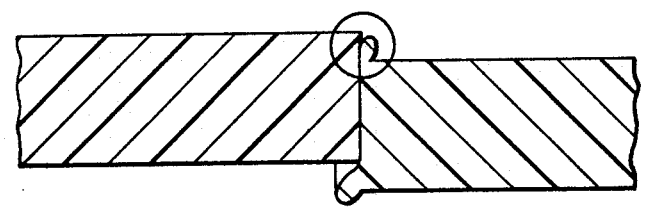
Figure 5A:
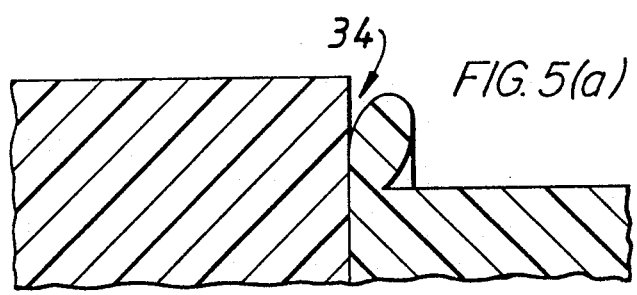
Figure 12:
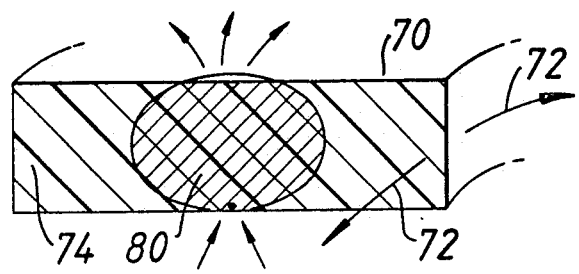

An embodiment of the invention will now be described by way of example with reference to the accompanying drawings in which:

FIG. 1 diagrammatically shows parts of two pipes made of cross-linked polyethylene and the effects of an unsuccessful attempt to join the pipes by fusion using a known procedure;

FIGS. 2 to 4 and 6 to 9 diagrammatically show parts of two members, such as pipes for example, made of cross-linked polyethylene, for example, at different stages of the method of joining the members by fusion using the invention;

FIG. 5 diagrammatically shows the effect of misalignment of the members;

FIGS. 10 to 12 diagrammatically show crack growth in a pipe; and

Figure 13:
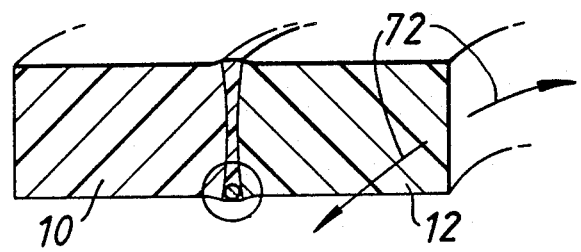
Figure 13A:
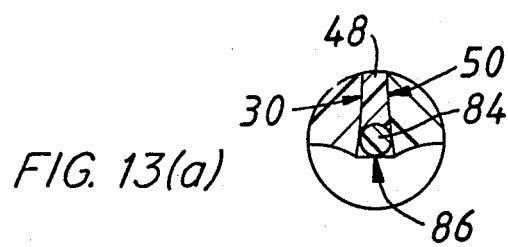

FIG. 13 diagrammatically shows parts of pipes joined by fusion using the invention to illustrate how crack growth is limited.

Figure 6:
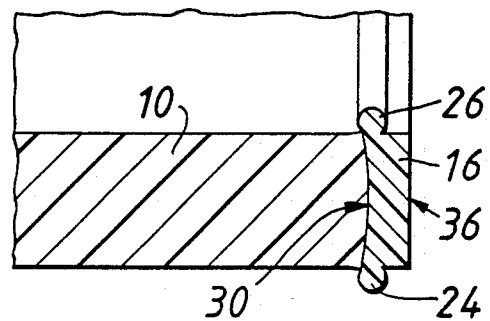
Figure 7:
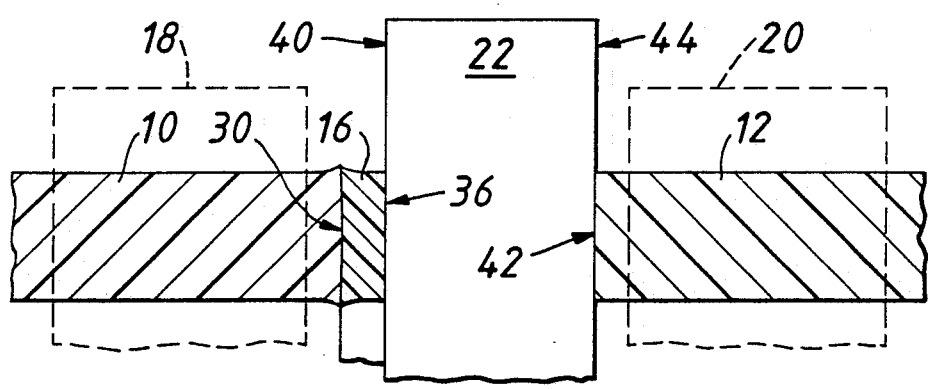

FIGS. 2 to 4 and 6 to 9 show stages in the joining by fusion of two members 10, 12 of for example crosslinked polyethylene using a third member 14 of for example medium density polyethylene (FIG. 6). In the example shown by way of illustration the members 10, 12 and 14 are pipes or parts of pipes.

Briefly, the method consists of joining one cross-linked pipe 10 to the medium density pipe 14 by fusion (FIGS. 2 to 4); cutting off an unwanted part of the pipe 14 to leave a stub part 16 of the pipe 14. (FIGS. 6 & 7); and joining the other cross-linked pipe 12 to the stub part 16 by fusion, repeating the steps illustrated in FIGS. 2, 3 & 4 but with the joined pipe 10 and stub part 16 replacing the original pipe 10 and the pipe 12 replacing the original pipe 14, say. If preferred, the pipe 10 and the pipe 10 and the stub 16 can replace the original pipe 14 and the pipe 12 can replace the original pipe 10 in the fusion machine.

FIG. 2 shows the pipes 10 and 14 held in respective clamps 18, 20 of the machine. The ends of the pipes are pressed against an electrically heated plate 22 the temperature of which is held constant at a value preferably in the range 190°—200° Celsius. The clamps 18, 20 are forced towards each other by a hydraulic cylinder (not shown) which interconnects the clamps. The plate 22 is free to move in the lengthwise direction of the pipes 10, 14. The ram exerts a force F on one clamp in one sense and by reaction exerts an equal and opposite force F on the other clamp. For example, the pressure between the pipe in each case and the plate 22 is held in the range 0.1 to 0.2 mega Newtons per square metre, the force F being the product of that pressure and the area of the end surface of the pipe.

The end surfaces of the pipes 10, 14 heat up and the value of the MFI of the medium density polyethylene pipe 14 (say 0.3) is such that the pipe is upset as shown to form initial external and internal beads 24, 26, respectively. The stage shown in FIG. 2 is the bead-up stage and typically occupies a period of 30 seconds, for example.

The MFI of the cross-linked pipe 10 is typically zero, so that the pipe 10 is not upset to form any beads.

A heat soak stage follows the bead-up stage. The pressure between the pipe ends and the plate 22 is reduced by a factor of ten (0.01 to 0.02 MN/m2) during a period of 3 minutes (FIG. 3).

After the heat soak stage the pipes 10, 14 are withdrawn from the plate 22 by retraction of the clamps 18, 20. The plate 22 is withdrawn and the ends of the pipes are now both above the melting range for the polymer, e.g. polyethylene in this example typically above 140° Celsius. The ends are next mutually engaged in alignment at a first interface 30. The period between separation of the pipes from the plate and mutual engagement (plate removal period) is typically 8 seconds, for example.

The final stage is the fusion stage (FIG. 4) which lasts typically for example, for 10 minutes. In this stage the pressure between the pipe ends is restored to the value used in the bead-up stage (0.1 to 0.2 MN/m²). The beads 24, 26 are completed in this stage. The material of the pipe 10 is not upset to form beads.

The material of the pipe 10 in the interface between the pipes 10, 14 (see the interface 30 referred to below) does not flow in a bulk fashion even though it is above the melting range for polyethylene. This is because of the cross-linked nature of the material of the pipe 10. However, there is believed to be displacement of the material at say the molecular level. This ensures mutual wetting of the materials of the two pipes 10, 14. The material of the pipe 14 flows in the usual way in bulk manner. This ensures that voids, cracks or other sources of weakness in the material of the pipe 10 are filled by material of the pipe 14. The result is surprisingly a full-strength fusion joint between the two pipes 10, 14 produced by bulk flow of only the pipe 14 under butt fusion conditions of temperature pressure and time within the ranges normally employed for joining two pipes of say MDPE. The bulk flow of the pipe 14 provides the flow and pressure conditions in the interface 30 (see below) to ensure a full-strength joint in place of the bulk flow contribution from both pipes which is relied on in conventional butt fusion where the MFI of each pipe is high enough to ensure bulk flow.

The assembly is allowed to cool to complete the joint before the pressure in the hydraulic cylinder is reduced.

FIG. 4 shows the beads 24, 26 which are both offset from the interface 30 towards the pipe 14. The pipes are readily held in alignment by the clamps 18, 20 which are positioned as close as practicable to the end surfaces of the pipes.

FIG. 5 shows the effect of misalignment. The bead does not cover the interface at regions at the outside and the inside. A sharp defect occurs at each side e.g. at 34. This causes the joint to be unacceptably weak.

The next stage of the method is shown at FIG. 6. An unwanted major part of the pipe 14 is removed by cutting through the pipe quite close to the first interface 30 to leave a minor annular stub part 16 joined to the pipe 10. The stub part 16 has a free end surface 36, preferably some 4 to 6 millimetres from the first interface 30. The stub part 16 is to be joined to the second cross-linked pipe 12. The upsetting of the stub part 16 shortens the stub part as will become apparent from the ensuing description. The length of the stub part 16 is selected so that, as the result of shortening of the stub part by upsetting the interface between the stub part 16 and the pipe 12 finally occupies a position adjacent the interface 30 between the pipe 10 and the stub part 16. in the clamps 18, 20 of the butt machine at the start of the bead up stage. The free end surface 36 of the stub part 16 engages one face 40 of the heater plate 22. The free end surface 42 of the pipe 12 engages the opposite face 44 of the plate 22.

The outer and inner beads 24, 26 were removed before the pipes were positioned in the machine. It is not essential to remove the beads. However, in some cases removal of the notch effects at the bead roots gives better stress cracking resistance performance and it is then preferable to remove the beads.

Figure 8:
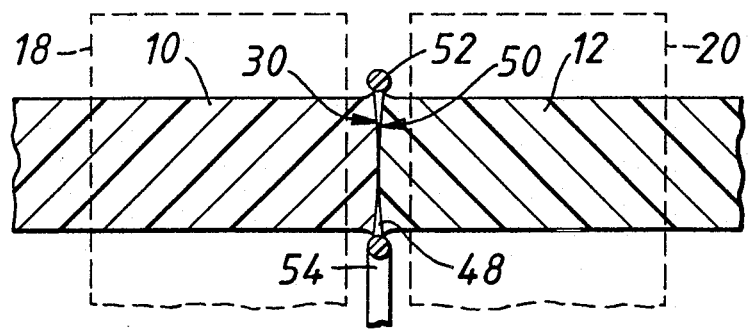

The stages already described with reference to FIGS. 2 to 4 are next repeated to form a fusion joint between the stub part 16 and the pipe 12. The end of the fusion stage is shown in FIG. 8, which corresponds to FIG. 4. As the result of upset of the medium density polyethylene of the stub part 16, the stub part has been reduced in length until it is but a thin wafer 48. The final position of the interface 50 between the wafer 48 and the pipe 12 is immediately adjacent the interface 30 between the pipe 10 and the stub part 16. As before, there is no upset of the cross-linked polyethylene of the pipe 12. Only the medium density polyethylene of the stub part 16 is upset to form new external and internal beads 52, 54.

After the joint has cooled and been completed, the pipes are removed from the machine and preferably the beads 52, 54 are removed to leave the final joint as shown in FIG. 9. The enlarged scrap view of the joint in FIG. 9 diagrammatically shows the structure of the joint zone. At each interface, 30, 50 there is respective columnar structure in the cross-linked polyethylene of the pipe 10 or 12 which extends away from the wafer 48.

FIGS. 10 to 12 show a section of a pipe 70 subject to hoop stress 72 affecting a failure plane 74. An origin or initiation point 76 is shown in the plane 74.

FIG. 11 shows the normal slow crack growth from the initiation point 76, the crack 80 propagating in the plane 74.

FIG. 12 shows a full failure condition when the crack 80 has grown to span the full wall thickness of the pipe 70. The length of the crack 80 in the direction of the length of the pipe 70 is usually equal to the pipe wall thickness or greater.

FIG. 13 shows the pipes 10, 12 joined as described above and subjected to the hoop stress 72. A crack 84 developing from an initiation point 86 at the surface of the wafer 48 will grow until it encounters the interfaces 30, 50 where the much more stress-crack-resistant cross-linked polyethylene prevents further growth. The crack cannot propagate through the full wall thickness of the pipes but is instead limited at a very early stage in its development. Accordingly, if the wafer 48 is thin in relation to the thickness of the walls of the pipes 10, 12 failure of the joint in the brittle stress crack growth mode under hoop stress will not occur in the medium density polyethylene within the wafer 48 of the joint.

The invention can be used to join members other than hollow members, for example to join slabs or sheets of polyolefinic material or other sections. The invention is applicable to polyolefins other than polyethylene such as polypropylene members. The terms polyethylene and polypropylene have meanings commonly in use so as to embrace both single polymer forms and also copolymer forms. Thus, for example the term medium density polyethylene is commonly applied to a material which is in fact a complex form of material made up of two different polymers and normally called a copolymer of ethylene and other materials.

In a modification, one of the members 10, 12 has a polyolefinic material such as polyethylene deposited on a surface. For example, the material is deposited by spraying. This provides a layer which constitutes the third member. The other of the members 10, 12 is then joined by fusion to the layer by heating respective surfaces of the layer and that other member and pressing the heated surfaces together.

In another modification, the surfaces of the three members 10, 12, 14 are all heated at once, for example by hot air or other gas, and then the pairs of surfaces are pressed together. Heating by hot air or gas can be used in place of the heater plate technique described with reference to the drawings.

We claim:

1. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, second and third members while said surfaces are separated; engaging said heated surface of said first and third members and said second and third members with each other in mutual alignment at respective first and second interfaces; and pressing said surfaces of said first and third members and said second and third members against each other so that the heated surfaces of said third member upset to form beads while the heated surfaces of said first and second members do not upset to form beads, and said first and third members and said second and third members are respectively joined by fusion at said interfaces, the step of heating said respective surfaces comprising passing hot gas over said surfaces to provide heating thereof.

2. A method according to claim 1, the third member having an MFI of 0.2 or more.

3. A method according to claim 1 the first and second members being of cross-linked material and the third member being of non-cross-linked material.

4. Members joined by the method according to claim 1.

5. Hollow members joined by the method according to claim 1.

6. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, second and third members while said surfaces are separated; engaging said heated surfaces of said first and third members and said second and third members with each other in mutual alignment at respective first and second interfaces; and pressing said surfaces of said first and third members and said second and third members against each other so that the heated surfaces of said third member upset to form beads while the heated surfaces of said first and second members do not upset to form beads, and said first and third members and said second and third members are respectively joined by fusion at said interfaces, the step of heating comprising pressing said respective surfaces against respective faces of a heater means.

7. A method according to claim 6, the first and second members being of cross-linked material and the third member being of non-cross-linked material.

8. Members joined by the method according to claim 6.

9. A Hollow members joined by the method according to claim 6.

10. A method for joining first and second members each composed of polyolefinic material having an MFI of zero or extremely low value, aid method comprising providing between said members a third member composed of polyolefinic material having an MFI which is higher than the MFI of said first and second members; heating respective surfaces of said first, second and third members while said surfaces are separated; engaging said heated surfaces of said first and third members and said second and third members with each other in mutual alignment at respective first and second interfaces; and pressing said surfaces of said first and third members and said second and third members against each other so that the heated surfaces of said third member upset to form beads while the heated surfaces of said first and second members do not upset to form beads, and said first and third members and said second and third members are respectively joined by fusion at said interfaces, the step of heating said respective surfaces comprising passing radiant energy into said surfaces to provide heating thereof.

11. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, second and third members while said surfaces of said first and third members are separated, and while said surfaces of said second and third members are engaged at an interface, engaging said heated surfaces of said first and third members with each other in mutual alignment at an interface; and pressing said surfaces of said first and third members and said second and third members against each other so that the heated surfaces of said third member upset to form beads while the heated surfaces of said first and second members do not upset to form beads and so that said first and third members and said second and third members are respectively joined by fusion at said interfaces, the step of heating said respective surfaces comprising passing hot gas over said surfaces to provide heating thereof.

12. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, second and third members while said surfaces of said first and third members are separated, and while said surfaces of said second and third members are engaged at an interface, engaging said heated surfaces of said of said first and third members with each other in mutual alignment at an interface; and pressing said surfaces of said first and third members and said second and third members against each other so that the heated surfaces of said third member upset to form beads while the heated surfaces of said first and second members do not upset to form beads and so that said first and third members and said second and third members are respectively joined by fusion at said interfaces, the step of heating and respective surfaces comprising pressing said respective surfaces against respective faces of a heater means.

13. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, second and third members while said surfaces of said first and third members are separated, and while said surfaces of said second and third members are engaged at an interface engaging said heated surfaces of said of said first and third members with each other in mutual alignment at an interface; and pressing said surfaces of said first and third members and said second and third members against each other so that the heated surfaces of said third member upset to form beads while the heated surfaces of said first and second members do not upset to form beads and so that said first and third members and said second and third members are respectively joined by fusion at said interfaces, the step of heating said respective surfaces comprising passing radiant energy into said surfaces to provide heating thereof.

14. A method for joining first and second members each composed of polyolefinic material having an MFI of zero or extremely low value, said method comprising providing between said members a third member composed of polyolefinic material having an MFI which is higher than the MFI of said first and second members; heating respective surfaces of said first, with each other in mutual alignment at respective first and second interfaces; and pressing said surfaces of said first and third members and said second and third members against each other so that the heated surfaces of said third member upset to form beads while the heated surfaces of said first and second members do not upset to form beads and so that said first and third members and said second and third members are respectively joined by fusion at said interfaces, the step of heating said respective surfaces comprising passing radiant energy into said surfaces to provide heating thereof.

15. A method of joining first and second members each composed of polyolefinic material having an MFI of zero or of extremely low value comprising providing between said members a third member composed of polyolefinic material having an MFI which is higher than the MFI of said first and second members, said method further comprising:
pressing respective surfaces of said first and third members against respective faces of a heater means;
continuing to press said surfaces against said faces under reduced pressure;
separating said surfaces from said faces; engaging the heated surfaces of said first and third members with each other in mutual alignment at an interface;
pressure said surfaces against each other so that said heated surface of said third member upsets to form a bead while the heated surface of said first member does not upset to form a bead;
cutting off an unwanted part of said third member to leave a stub part of said third member jointed to said first member;
pressing respective surfaces of said second member and said stub part of said third member against respective faces of said heater means;
continuing to press said respective surfaces of said second member and said stub part of said third member against said faces of said heater means under a reduced pressure;
separating said surfaces of said second member and said stub part of said third member from said faces of said heater means;
engaging the heated surfaces of said second member and said stub part of said third member with each other in mutual alignment at a second interface; and
pressing said surfaces of said second member and said stub part of said third member against each other so that said stub part of said third member upsets to form a bead while said second part does not upset to form a bead.

16. A method of joining first and second members each composed of polyolefinic material having an MFI of zero or of extremely low value comprising providing between said members a third member composed of polyolefinic material having an MFI which is higher than the MFI of said first and second members; said method further comprising:
heating respective surfaces of said first and third members by passing a hot gas over said surfaces;
engaging the heated surfaces of said first and third members with each other in mutual alignment at an interface;
pressing the engaged surfaces against each other so that the heated surface of said third member upsets to form a bead while the heated surface of said first member does not upset to form a bead;

cutting off an unwanted part of said third member to leave a stub part of aid third member joined to said first member;

heating respective surfaces of said second member and said stub part of said third member by passing a hot gas over said surfaces;

engaging the heated surfaces of said second member and said stub part of said third member with each other in mutual alignment at a second interface; and pressing the engaged surfaces of said second member and said stub part of said third member against each other so that the heated surface of said second member does not upset to form a bead;

17. A method of joining first and second members each composed of polyolefinic material having an MFI of zero or of extremely low value comprising providing between said members a third member composed of polyolefinic material having an MFI which is higher than the MFI of said first and second members, said method further comprising:

passing radiant energy into respective surfaces of said first and third members while said surfaces are engaged with each other in mutual alignment at an interface to provide heating of said respective surfaces;

pressing the heated surfaces against each other so that the heated surface of said third member upsets to form a bead while the heated surface of said first member does not upset to form a bead;

cutting off an unwanted part of said third member to leave a stub part of said third member joined to said first member;

passing radiant energy into respective surfaces of said second member and said stub part of said third member while said surfaces of said second member and said stub part are engaged with each other in mutual alignment at an interface to provide heating thereof; and pressing the heated surfaces of said second member and said stub part of said third member against each other so that said heated surface of said stub part upsets to form a bead while the heated surface of said second member does not upset to form a bead.

* * * * *